(12) United States Patent
Antinori et al.

(10) Patent No.: US 12,124,845 B2
(45) Date of Patent: Oct. 22, 2024

(54) MANAGING A CARBON FOOTPRINT ASSOCIATED WITH EXECUTING A CONTINUOUS INTEGRATION PIPELINE ON COMPUTER NODES

(71) Applicant: RED HAT, INC., Raleigh, NC (US)

(72) Inventors: Paolo Antinori, Novara (IT); Alessio Soldano, Gallarate (IT)

(73) Assignee: RED HAT, INC., Raleigh, NC (US)

( * ) Notice: Subject to any disclaimer, the term of this patent is extended or adjusted under 35 U.S.C. 154(b) by 66 days.

(21) Appl. No.: 17/971,924

(22) Filed: Oct. 24, 2022

(65) Prior Publication Data

US 2024/0134643 A1 Apr. 25, 2024
US 2024/0231817 A9 Jul. 11, 2024

(51) Int. Cl.
*G06F 8/77* (2018.01)
*G06Q 30/018* (2023.01)

(52) U.S. Cl.
CPC ............ *G06F 8/77* (2013.01); *G06Q 30/018* (2013.01)

(58) Field of Classification Search
None
See application file for complete search history.

(56) References Cited

U.S. PATENT DOCUMENTS

| | | | |
|---|---|---|---|
| 10,540,202 B1* | 1/2020 | Smaldone | G06F 9/5027 |
| 11,307,971 B1* | 4/2022 | Weldemariam | G06F 16/2379 |
| 12,007,876 B2* | 6/2024 | Easton | G06F 11/3664 |
| 2007/0136720 A1* | 6/2007 | Roy | G06F 9/30 717/140 |
| 2010/0257531 A1 | 10/2010 | Barsness et al. | |
| 2011/0041066 A1* | 2/2011 | Kimmet | H04L 47/829 715/736 |
| 2016/0380844 A1* | 12/2016 | Duncan | G06F 3/0482 715/736 |
| 2019/0361800 A1* | 11/2019 | Parees | G06F 11/3684 |
| 2022/0156809 A1* | 5/2022 | Deng | G06F 9/5027 |
| 2022/0326913 A1* | 10/2022 | Podder | G06F 8/20 |
| 2023/0017632 A1* | 1/2023 | Herb | G06F 11/3058 |
| 2023/0229409 A1* | 7/2023 | Reineke | G06F 8/45 717/140 |
| 2024/0037564 A1* | 2/2024 | Aurongzeb | G06Q 30/018 |

OTHER PUBLICATIONS

A. Radovanovic et al., "Carbon-Aware Computing for Datacenters," Jun. 11, 2021, arXiv:2016.11750v1. (Year: 2021).*

(Continued)

*Primary Examiner* — Andrew M. Lyons
(74) *Attorney, Agent, or Firm* — Kilpatrick Townsend & Stockton LLP

(57) ABSTRACT

A carbon footprint associated with executing a job on one or more computer nodes can be automatically managed using some techniques described herein. As one particular example, a system can determine a first carbon footprint associated with applying a continuous integration (CI) pipeline to source code using a first set of nodes of a continuous integration system. The system can also select a second set of nodes of the continuous integration system, the second set of nodes being associated with a second carbon footprint that is lower than the first carbon footprint. The system can then control the continuous integration system to apply the CI pipeline to the source code using the second set of nodes.

20 Claims, 10 Drawing Sheets

(56) References Cited

OTHER PUBLICATIONS

"Reduce your Google Cloud carbon footprint", https://cloud.google.com/architecture/reduce-carbon-footprint, 2021; pp. 1-12.
Kern et al., "Impacts of software and its engineering on the carbon footprint of ICT", Environ Impact Asses Rev (2014), http://dx.doi.org/10.1016/j.eiar.2014.07.003; pp. 1-9.
"Carbon Footprint Preview", https://cloud.google.com/carbon-footprint, 2022; pp. 1-8.
Zaninotto, Francois, "Argos: Measure The Carbon Footprint Of Software, Improve Developer Practices", https://marmelab.com/blog/2020/11/26/argos-sustainable-development.html, 2020; pp. 1-15.

\* cited by examiner

MANAGING A CARBON FOOTPRINT ASSOCIATED WITH EXECUTING A CONTINUOUS INTEGRATION PIPELINE ON COMPUTER NODES

TECHNICAL FIELD

The present disclosure relates generally to managing the carbon footprint associated with executing computing jobs. More specifically, but not by way of limitation, this disclosure relates to monitoring and controlling the carbon footprint associated with executing a continuous integration pipeline or other jobs on one or more nodes of a distributed computing system.

BACKGROUND

Distributed computing systems have recently grown in popularity given their improved scalability, performance, resilience, and cost effectiveness. Distributed computing systems generally include a group of nodes (e.g., physical machines or virtual machines) in communication with each other via one or more networks, such as a local area network or the Internet. Examples of distributed computing systems can include cloud computing systems, data grids, and computing clusters. Distributed computing systems can be used to execute a wide range of computing jobs, which may involve storing data, retrieving data, or performing computations.

When a node executes a job, it consumes electrical energy. The electrical energy may have been generated in a way that releases greenhouse gases such as carbon dioxide and methane into the environment. For example, a node may consume electrical energy that is generated through the consumption of fossil fuels by an energy provider. The energy provider can be different from a service provider hosting the distributed computing system. The consumption of fossil fuels may produce byproducts such as carbon compounds that are then released into the air. As a result, the execution of a job by a node may have a corresponding carbon footprint.

DETAILED DESCRIPTION

Figure 1:
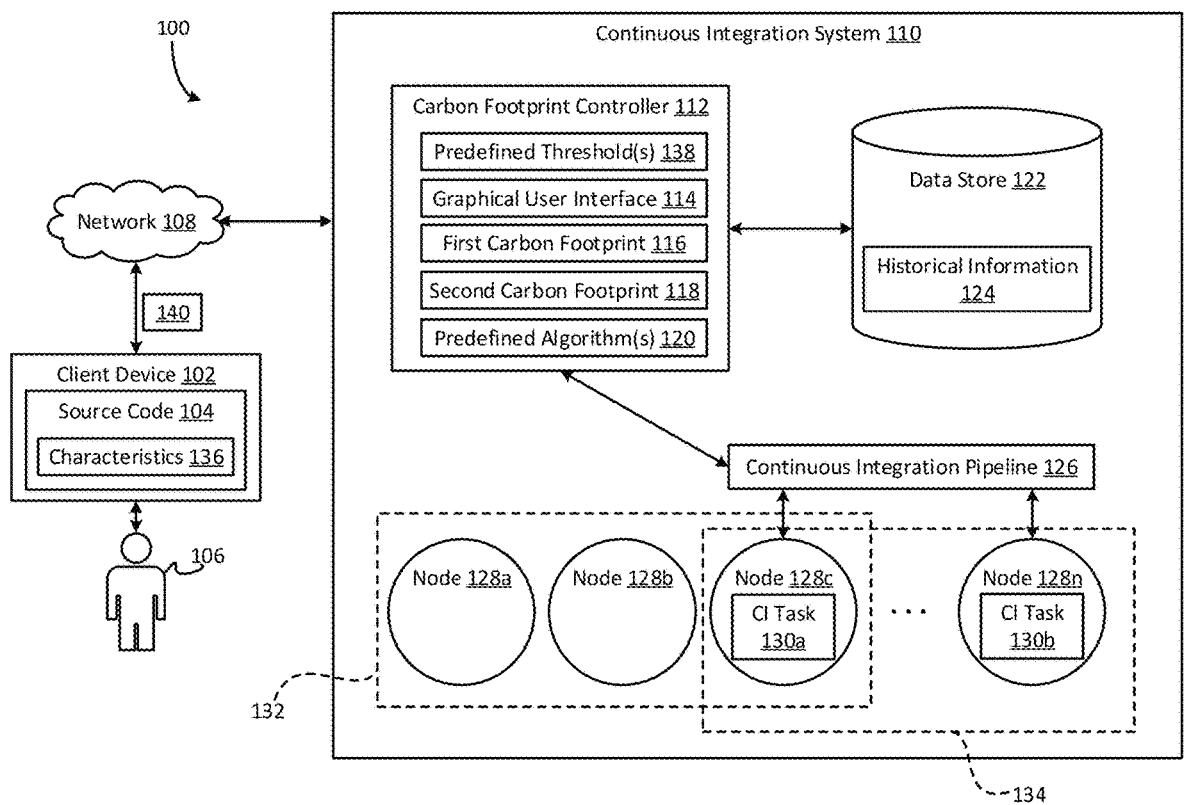
FIG. 1 shows a block diagram of an example of a system for managing a carbon footprint associated with executing a continuous integration pipeline according to some aspects of the present disclosure.

A distributed computing system can include hundreds of networked nodes that execute thousands of jobs each day. Each time the nodes execute a job, they consumes electrical energy. The electrical energy may have been generated in a way that releases greenhouse gases such as carbon dioxide and methane into the environment. Thus, execution of a job by the nodes can contribute to the overall carbon footprint associated with the distributed computing system. Some types of jobs may consume more electricity, and thus have higher contributions to the overall carbon footprint, than other jobs. For example, jobs containing multiple tasks may consume more electricity than jobs containing fewer tasks. Users may wish to monitor and optimize (e.g., reduce) their individual carbon footprints, for example to reduce their environmental impact. Likewise, system administrators may wish to monitor and optimize the overall carbon footprint associated with the distributed computing system. But, it can be challenging to perform this type of monitoring and optimization because existing tools generally fail to consider the carbon footprints associated with executing jobs.

The abovementioned challenges can amplified in certain contexts, for example where a job involves a cascading series of interrelated tasks. One such situation can arise in the context of continuous integration. Continuous integration is the process of merging developers' working copies of source code into a shared mainline code-base at frequent intervals, such as multiple times a day. Continuous integration is implemented by a continuous integration system, which can include multiple nodes executing continuous integration tasks that form part of an overall continuous integration pipeline. Developers can submit source code at periodic intervals to the continuous integration system, which can implement the continuous integration pipeline. The continuous integration pipeline can attempt to produce a build from the source code. A build is executable code that has been successfully created and tested for software program, such as a software application. Generally, the continuous integration pipeline includes multiple phases that are executed in a sequential order. The continuous integration pipeline can begin with a compilation phase in which the source code is compiled into artifacts. Artifacts are executable code that has been compiled from source code for testing. The continuous integration pipeline can then perform a testing phase in which various types of tests (e.g., integration tests, acceptance tests, and unit tests) are executed on the artifacts. The testing phase can enable the developers to rapidly detect defects in the source code, so that they can be corrected as soon as possible.

Some examples of the present disclosure can overcome one or more of the abovementioned problems by automatically optimizing (e.g., reducing) a carbon footprint associated with executing one or more jobs, such as a continuous integration job configured to implement a continuous integration pipeline. For instance, a system can receive a request from a user to execute a job. In response to receiving the request, the system can identify a first set of nodes usable to execute the job, and determine a first carbon footprint associated with the first set of nodes. Additionally, the system can identify a second set of nodes usable to execute the job, and determine a second carbon footprint associated with the second set of nodes. If the second carbon footprint is lower than the first carbon footprint, then the system can automatically execute the job using the second set of nodes. If the second carbon footprint is higher than the first carbon footprint, then the system can automatically repeat the above process until a set of nodes with a carbon footprint that is lower than the first carbon footprint is identified. The identified set of nodes can then be used to execute the job. In some examples, the system can automatically select different sets of nodes and compare their carbon footprints in an iterative manner until an optimal set of nodes is identified on which to execute the job. The optimal set of nodes can have the lowest carbon footprint among the analyzed sets of nodes. Using these techniques, the carbon footprint associated with executing the job can be reduced. Optimizing the carbon footprint at the job level or task level may provide a more-granular level of control over a user's carbon footprint than may otherwise be possible.

As one particular example in the context of continuous integration, a system can receive a request from a software developer for applying a continuous integration pipeline to source code. The source code can correspond to a software project. In response to receiving the request, the system can identify a first set of nodes usable to apply the continuous integration pipeline to the source code. The system can then determine a first carbon footprint associated with the first set of nodes. Additionally, the system can automatically identify a second set of nodes usable to apply the continuous integration pipeline to the source code. The system can then determine a second carbon footprint associated with the second set of nodes. If the second carbon footprint is lower than the first carbon footprint, then the system can automatically apply the continuous integration pipeline to the source code using the second set of nodes. If the second carbon footprint is higher than the first carbon footprint, then the system can automatically repeat the above process until a set of nodes with a carbon footprint that is lower than the first carbon footprint is identified. The identified set of nodes can then be used to apply the continuous integration pipeline to the source code. In some examples, the system can automatically select different sets of nodes and compare their carbon footprints in an iterative manner until an optimal set of nodes is identified on which to execute the continuous integration pipeline. The optimal set of nodes can have the lowest carbon footprint among the analyzed sets of nodes. Using these techniques, the carbon footprint associated with applying the continuous integration pipeline to the source code can be reduced.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 shows a block diagram of an example of a system 100 for managing a carbon footprint associated with executing a continuous integration pipeline 126 according to some aspects of the present disclosure. The system 100 can include a client device 102 operable by a user 106, such as a software developer. Examples of the client device 102 can include a laptop computer, desktop computer, tablet, or mobile phone. The user 106 can draft source code 104 for a software program using the client device 102.

In some examples, the source code 104 can analyzed and validated using a continuous integration system 110. The continuous integration system 110 may be, or may be a subpart of, a distributed computing system. The continuous integration system 110 can be remote from the client device 102, which can communicate with the continuous integration system 110 via one or more networks 108 such as the Internet. For example, the client device 102 can transmit a request 140 associated with the source code 104 to the continuous integration system 110 via a network 108. The request 140 may include the source code 104 itself, or may include a reference identifier usable by the continuous integration system 110 to access the source code 104. The request 140 may be configured to initiate a continuous integration process with respect to the source code 104.

The continuous integration system 110 can receive the request 140 and, in response to the request 140, may apply a continuous integration pipeline 126 to the source code 104. Applying a continuous integration pipeline 126 to source code 104 can involve executing continuous integration tasks 130a-b with respect to the source code 104. The continuous integration pipeline 126 can involve any number of continuous integration tasks 130a-b, which can be executed by any number of nodes 128a-n of the continuous integration system 110. Examples of the continuous integration tasks 130a-b can include compiling the source code into one or more artifacts, testing the one or more artifacts using different kinds of tests, etc. As the nodes 128a-n execute the continuous integration pipeline 126 (e.g., the continuous integration tasks 130a-b) on the source code 104, the nodes 128a-n can consume electrical energy. The electrical energy may have been generated using a process that produces greenhouse gases, so there may be a carbon footprint associated with executing the continuous integration pipeline 126 on the source code 104.

To help monitor and optimize carbon footprints associated with executing continuous integration pipelines and other jobs, the system 100 can include a carbon footprint controller 112. The carbon footprint controller 112 may be software, hardware, or any combination thereof. The carbon footprint controller 112 can be internal or external to the continuous integration system 110. The carbon footprint controller 112 can be configured to automatically perform operations for reducing the carbon footprint associated with individual users or the continuous integration system 110 as a whole.

More specifically, the carbon footprint controller 112 can be notified of the request 140 from the client device 102. Based on this notification, the carbon footprint controller 112 can select a first set of nodes 132 usable to apply the continuous integration pipeline 126 to the source code 104. The carbon footprint controller 112 can select the first set of nodes 132 using any number and combination of techniques. For example, the carbon footprint controller 112 can randomly select the first set of nodes 132. As another example, the carbon footprint controller 112 can select the first set of nodes 132 based on a user preference (e.g., as input by the user 106 or a system administrator). As yet another example, the carbon footprint controller 112 can select the first set of nodes 132 based on default settings of the continuous integration system 110. As still another example, the carbon footprint controller 112 can select the first set of nodes 132 based on a round-robin scheme or another predefined algorithm. Although the first set of nodes 132 includes three nodes 128a-c in FIG. 1, it will be appreciated that in other examples the first set of nodes 132 can include any number of nodes.

After selecting the first set of nodes 132, the carbon footprint controller 112 can determine (e.g., predict) a first carbon footprint 116 associated with the first set of nodes 132. The carbon footprint controller 112 can determine the first carbon footprint 116 based on any number and combination of factors. For example, the carbon footprint controller 112 can determine the first carbon footprint 116 based on the characteristics of the first set of nodes 132. Examples of such characteristics can include the nodes' hardware configurations and geographic locations. For instance, some hardware may consume more electrical energy than other hardware, so the first carbon footprint 116 can depend on the nodes' hardware. As another example, some geographical locations may use more green technologies to generate their electrical energy than other geographical locations, so the first carbon footprint 116 can depend on the geographical locations of the nodes 128a-c in the first set of nodes 132. The carbon footprint controller 112 can determine the characteristics of the first set of nodes 132 using any suitable technique, such as by communicating with the first set of nodes 132 or accessing a predefined lookup table that maps the nodes 132a-c to their corresponding characteristics.

Additionally or alternatively, the carbon footprint controller 112 can determine the first carbon footprint 116 based on the characteristics of the continuous integration pipeline 126. Examples of the characteristics of the continuous integration pipeline 126 can include the settings of the continuous integration pipeline 126, the number and types of continuous integration tasks 130a-b in the continuous integration pipeline 126, and the order of the continuous integration tasks 130a-b in the continuous integration pipeline 126. The carbon footprint controller 112 can determine the characteristics of the continuous integration pipeline 126 based on configuration data associated with the continuous integration pipeline 126. The carbon footprint controller 112 can receive the configuration data for use in determining the characteristics of the continuous integration pipeline 126.

Additionally or alternatively, the carbon footprint controller 112, the carbon footprint controller 112 can determine the first carbon footprint 116 based on other factors, such as the input to the continuous integration pipeline 126. For example, the carbon footprint controller 112 can determine the first carbon footprint 116 based on one or more characteristics 136 of the source code 104 to which the continuous integration pipeline 126 is to be applied. Examples of the characteristics 136 can include a length and a complexity of the source code 104. The longer or more complex the source code 104, the more energy may be consumed by the first set of nodes 132 in applying the continuous integration pipeline 126. The carbon footprint controller 112 can determine the characteristics 136 of the source code 104 by analyzing the source code 104. For example, the carbon footprint controller 112 can parse the source code 104 into branches to determine its cyclomatic complexity.

Any one or more of the above factors can be taken into account by the carbon footprint controller 112 to determine the first carbon footprint 116. To actually compute the first carbon footprint 116 based on the above factors, the carbon footprint controller 112 may rely on stored data and/or predefined algorithms 120. For example, the carbon footprint controller 112 can compute the first carbon footprint 116 using historical information 124 stored in a data store 122. The data store 122 may be internal or external to the continuous integration system 110.

In some examples, the historical information 124 can indicate resource consumption by hardware of the first set of nodes 132 during a prior timespan. For instance, the historical information 124 can indicate the resource consumption by the first set of nodes 132 as a result of prior executions of the continuous integration pipeline 126 or other jobs (e.g., other continuous integration pipelines). Examples of the resource consumption can include CPU, memory, disk, and bandwidth usage by the first set of nodes 132. The prior executions may have been performed with respect to older versions of the same source code 104 or with respect to different source code. In some examples, the continuous integration pipeline 126 may have had different characteristics during the prior executions, so the characteristics of the continuous integration pipeline 126 during each prior execution can also be stored in the historical information 124. Other data may additionally or alternatively be stored in the historical information 124. For instance, the characteristics of the source code used in the prior executions may also be stored in the historical information 124. For example, the length and complexity of the source code used in the prior executions may also be stored in the historical information 124.

From the stored historical information 124, the continuous integration system 110 may be able to determine the first carbon footprint 116 associated with applying the continuous integration pipeline 126 to the source code 104 using the first set of nodes 132. For example, the carbon footprint controller 112 can access the historical information 124 to determine prior resource consumption associated with the first set of nodes 132 applying a continuous integration pipeline that has similar characteristics to the continuous integration pipeline 126 to source code that has similar characteristics to the source code 104. The carbon footprint controller 112 can then execute a predefined algorithm 120 to convert the prior resource consumption to a carbon footprint estimate, which the carbon footprint controller 112 can then use as the first carbon footprint 116.

After determining the first carbon footprint 116, in some examples the carbon footprint controller 112 can determine whether the first carbon footprint 116 meets or exceeds a predefined threshold 138. The predefined threshold 138 may be set by a user 106, a system administrator, or another entity. Determining whether the first carbon footprint 116 meets or exceeds a predefined threshold 138 can involve determining whether the first carbon footprint 116 alone, or in combination with other carbon footprints associated with other jobs of the user 106, meets or exceeds the predefined threshold 138. For example, a service provider may offer access to the continuous integration system 110 via a subscription model, where users can pay different amounts to subscribe to different service tiers. Each service tier may have a carbon-footprint limit that cannot be exceeded during a particular timeframe, such as per day or per month. So, the carbon footprint controller 112 can determine whether the first carbon footprint 116 would push the user 106 over the carbon-footprint limit for the user's 106 service tier. As another example, the predefined threshold 138 may be a carbon-footprint limit for a given job or task. The carbon-footprint limit can be preset by a system administrator or other user. For instance, the predefined threshold 138 may be a carbon-footprint cap that is allowed for a continuous integration job. So, the carbon footprint controller 112 can determine whether the first carbon footprint 116 meets or exceeds the carbon-footprint cap designated for the continuous integration job. As yet another example, the predefined threshold 138 may be a carbon-footprint limit for a given project (e.g., software project). For example, a software project may be assigned a carbon-footprint cap that cannot be exceeded during its entire development lifecycle. The carbon footprint associated with the software project can be tracked at the project level, for example as various development jobs and tasks are performed with respect to the software project. In some such examples, the carbon footprint controller 112 can determine whether the first carbon footprint 116 would push the software project over the carbon-footprint cap.

If the carbon footprint controller 112 determines that the first carbon footprint 116 does not meet or exceed the predefined threshold 138, then the carbon footprint controller 112 can configure the continuous integration system 110 to apply the continuous integration pipeline 126 to the source code 104 using the first set of nodes 132. Otherwise, the carbon footprint controller 112 can perform one or more operations configured to reduce the carbon footprint.

For example, the carbon footprint controller 112 can select a second set of nodes 134 in the continuous integration system 110. The carbon footprint controller 112 can select the second set of nodes 134 using any number and combination of techniques. For example, the carbon footprint controller 112 can randomly select the second set of nodes 134. As another example, the carbon footprint controller 112 can select the second set of nodes 134 based on a user preference (e.g., as input by the user 106 or a system administrator). As yet another example, the carbon footprint controller 112 can select the second set of nodes 134 based on characteristics of the second set of nodes 134. As still another example, the carbon footprint controller 112 can select the second set of nodes 134 based on a round-robin scheme or another predefined algorithm. Although the second set of nodes 134 includes two nodes 128c-n in FIG. 1, it will be appreciated that in other examples the second set of nodes 134 can include any number of nodes. And as shown in FIG. 1, in some examples the first set of nodes 132 can have at least one node 128c that is also included in the second set of nodes 134.

After selecting the second set of nodes 134, the carbon footprint controller 112 can determine (e.g., predict) a second carbon footprint 118 associated with the second set of nodes 134. The carbon footprint controller 112 can determine the second carbon footprint 118 based on any number and combination of the factors described above. For example, the carbon footprint controller 112 can determine the second carbon footprint 118 based on the characteristics of the second set of nodes 128c-n, the characteristics of the continuous integration pipeline 126, the input to the continuous integration pipeline 126, or any combination of these. To actually compute the second carbon footprint 118 based on the above factors, the carbon footprint controller 112 may use any of the techniques described herein. For example, the carbon footprint controller 112 can compute the second carbon footprint 118 using the historical information 124 stored in the data store 122.

After determining the second carbon footprint 118, in some examples the carbon footprint controller 112 can determine whether the second carbon footprint 118 is less than the first carbon footprint 116. If so, the carbon footprint controller 112 may also determine whether the second carbon footprint 118 meets or exceeds the predefined threshold 138. Determining whether the second carbon footprint 118 meets or exceeds the predefined threshold 138 can involve determining whether the second carbon footprint 118 alone, or in combination with other carbon footprints associated with other jobs of the user 106 during a particular time window, meets or exceeds the predefined threshold 138.

If the carbon footprint controller 112 determines that the second carbon footprint 118 is less than the first carbon footprint 116, and optionally if the carbon footprint controller 112 determines that the second carbon footprint 118 is less than the predefined threshold 138, the carbon footprint controller 112 can configure the continuous integration system 110 to apply the continuous integration pipeline 126 to the source code 104 using the second set of nodes 134. Using the second set of nodes 134, rather than the first set of nodes 132, to apply the continuous integration pipeline 126 to the source code 104 may result in a smaller carbon footprint.

If the carbon footprint controller 112 determines that the second carbon footprint 118 is greater than or equal to the predefined threshold 138, the carbon footprint controller 112 may iterate the above process until it identifies a set of nodes that has a carbon footprint below the predefined threshold 138. For example, the carbon footprint controller 112 can iteratively select a new set of nodes, determine the carbon footprint associated with the new set of nodes, and compare the carbon footprint to the first carbon footprint 116 and the predefined threshold 138. The carbon footprint controller 112 can iterate this process until a stopping condition is satisfied. Examples of the stopping condition can include a set of nodes satisfying both criteria being identified, a predefined number of iterations being completed, or all possible combinations of nodes having been analyzed. If the carbon footprint controller 112 is unable to identify a set of nodes that satisfies both criteria, the carbon footprint controller 112 may prevent or delay execution of the continuous integration pipeline 126. For example, the carbon footprint controller 112 can remove the continuous integration job from a job queue. The carbon footprint controller 112 can also notify the user 106 that the continuous integration job cannot be completed and the reason why. As another example, the carbon footprint controller 112 may schedule the continuous integration job for reevaluation at a later point in time.

In some examples, the carbon footprint controller 112 can perform an iterative optimization process to identify an optimal set of nodes that would have the lowest carbon footprint in relation to applying the continuous integration pipeline 126 to the source code 104. The optimal set of nodes can be whichever set of nodes results in the lowest carbon footprint as compared to all of the sets of nodes analyzed during the iterative optimization process. For example, the carbon footprint controller 112 can iteratively select two sets of nodes, compare their carbon footprints, and select the set of nodes associated with the lower carbon footprint for use in a subsequent iteration. This can be repeated until a stopping condition is satisfied (e.g., a predefined number of iterations is completed, or all possible combinations of nodes have been analyzed). The carbon footprint controller 112 can then configure the optimal set of nodes to apply the continuous integration pipeline 126 to the source code 104. This may result in a smaller carbon footprint than using the first set of nodes 128a-c.

In some examples, the carbon footprint controller 112 can generate a graphical user interface 114 for display to one or more entities, such as the user 106 or a system administrator. The graphical user interface 114 can specify the first carbon footprint 116, the second carbon footprint 118, or both of these. This may allow the entity to better understand the environmental impact associated with the continuous integration job and any improvements thereto automatically made by the carbon footprint controller 112.

Figure 2:
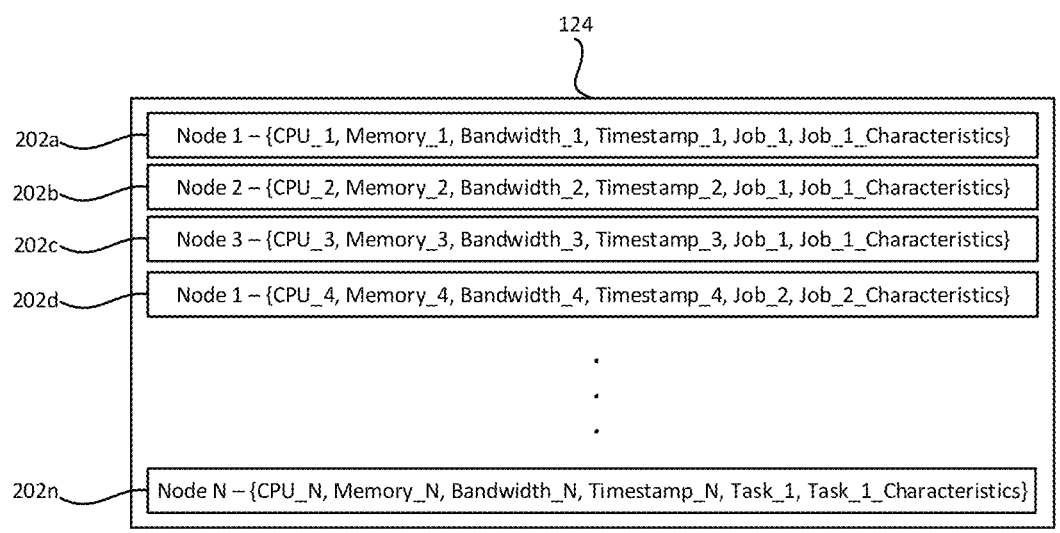
FIG. 2 shows an example of historical information according to some aspects of the present disclosure.

FIG. 2 shows an example of historical information 124 according to some aspects of the present disclosure. The historical information 124 can indicate resource consumption by hardware (e.g., processors, memory, storage, etc.) of nodes during a prior timespan. Any suitable software of the continuous integration system 110 can collect the resource usage metrics associated with the nodes over time and store them to produce the historical information 124.

As shown, the historical information 124 can include multiple entries 202a-n. Each entry 202a-n can include one or more resource usage metrics for a corresponding node of the continuous integration system 110. For example, entry 202a can include CPU, memory, and bandwidth metrics obtained at Timestamp 1 for Node 1 of the continuous integration system 110. In this example, the resource usage metrics stored in the entry 202a are individual values corresponding to a single timestamp (e.g., Timestamp 1). But in other examples, the resource usage metrics can be aggregates of multiple values obtained over multiple timestamps. For example, resource usage metrics of entry 202a can be averages, such as an average CPU usage, memory usage, and bandwidth usage over a previous time window.

Because different types of jobs or tasks may result in different amounts of resource consumption by a given node, it may be useful to store data about which jobs or tasks resulted in which resource usage on which node. Thus, in some examples, the entries 202a-n can also specify a job or task associated with the resource usage metrics. In the example shown in FIG. 2, entries 202a-c indicate that the resource consumption by Nodes 1-3 is specifically related to their execution of Job 1. Job 1 may be, for example, a continuous integration job. Entry 202d indicates that the resource consumption by Node 1 is specifically related to its execution of Job 2, which may be different from Job 1. Entry 202n indicates that the resource consumption by Node N is specifically related to its execution of Task 1, which may be different from Jobs 1-2.

Because various jobs or tasks may have different characteristics that impact the resource consumption of a given node in different ways, it may be useful to store data about the job characteristics or task characteristics. Thus, in some examples, the entries 202a-n can also specify job characteristics or task characteristics associated with the resource usage metrics. In the example shown in FIG. 2, entries 202a-c indicate the job characteristics associated with Job 1. Entry 202d indicates the job characteristics associated with Job 2. Entry 202n indicates indicate the job characteristics associated with Task 1.

Using the historical information 124, the carbon footprint controller 112 can determine the prior resource consumption of each node in a selected set of nodes in relation to performing whichever prior job or task is closest to the target job or task (e.g., applying the continuous integration pipeline 126 to the source code 104). To determine which prior job is closest to a target job, the carbon footprint controller 112 can compare the characteristics of the prior jobs executed by the selected set of nodes to the characteristics of the target job. For instance, the carbon footprint controller 112 can compare the types and settings of the prior jobs executed by the selected set of nodes to the type and settings of the target job, to identify which of the prior jobs executed by the selected set of nodes has the most in common with the target job. After determining which of the prior jobs or tasks is closest to the target job or task, the appropriate entries in the historical information 124 can be identified and used to determine a carbon footprint associated with executing the target job or task using the selected set of nodes.

As one particular example, if the selected set of nodes are Nodes 1-3, and Job 1 is closest to the target job, then the carbon footprint controller 112 can identify entries 202a-c as most applicable. The carbon footprint controller 112 can then use entry 202a to determine the resource consumption of Node 1, entry 202b to determine the resource consumption of Node 2, and entry 202c to determine the resource consumption of Node 3. The carbon footprint controller 112 can then apply one or more algorithms or lookup tables to convert the resource consumption of each node into a respective carbon footprint value. For example, the carbon footprint controller 112 can apply the one or more algorithms and/or lookup tables to convert the resource consumption of Node 1 into a first carbon footprint value, the resource consumption of Node 2 into a second carbon footprint value, and resource consumption of Node 3 into a third carbon footprint value. The carbon footprint controller 112 can then add together the respective carbon footprint values to predict an overall carbon footprint associated with using the set of nodes to execute the target job.

In some examples, the carbon footprint controller 112 can convert resource consumption to a carbon footprint value using a lookup table. For example, the carbon footprint controller 112 can have access to a lookup table that maps the resource consumption of various hardware components to corresponding electricity consumption. For instance, the lookup table can map a baseline amount of processor usage to a first amount of electricity consumption, a baseline amount of memory usage to a second amount of electricity consumption, and a baseline amount of bandwidth usage to a third amount of electricity consumption. An algorithm can then be used to convert the baseline amounts of electricity consumption into respective carbon footprint values, which can then be used to determine an aggregate carbon footprint value for a given node. In other examples, the lookup table can map the resource consumption of various hardware components directly to corresponding carbon footprint values, so that the algorithmic conversion may be skipped. This can speed up the process.

In some examples, the carbon footprint controller 112 can adjust the carbon footprint value that was computed for a given node based on one or more predefined rules. For example, the carbon footprint controller 112 can apply a predefined rule to adjust the carbon footprint value computed for a given node by a certain amount (e.g., percentage) based on the geographical location of the node. Because some geographical locations may produce less greenhouse gasses when generating electricity than other geographical locations, these differences may be taken into account using the predefined rules to more accurately compute the carbon footprint value. For instance, if the node is located in a geographical region that produces electricity using greener technologies, and thus emits fewer carbon byproducts than another geographical region that burns more fossil fuels, the carbon footprint controller 112 may reduce the carbon footprint value accordingly to account for that factor.

Figure 3:
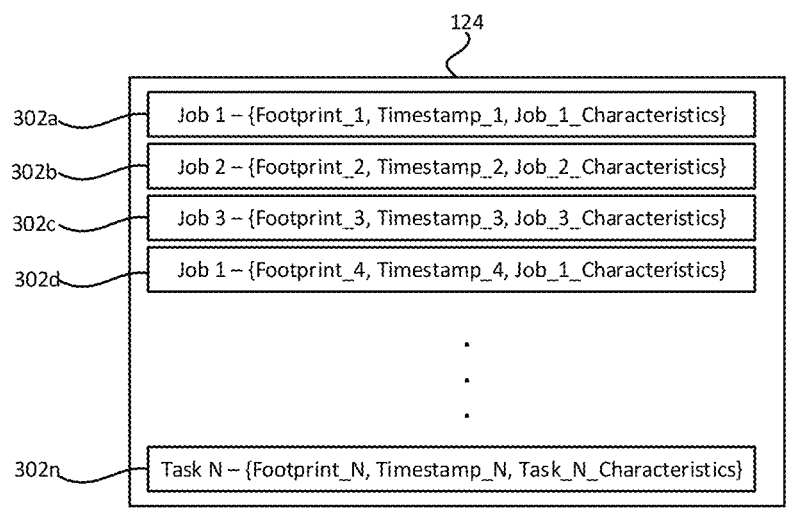
FIG. 3 shows another example of historical information according to some aspects of the present disclosure.

FIG. 3 shows another example of historical information 124 according to some aspects of the present disclosure. The historical information 124 can indicate the carbon footprints associated with prior executions of jobs or tasks during a prior timespan. In some examples, the carbon footprint controller 112 can compute the carbon footprints associated with the prior jobs or tasks and store them in the historical information 124.

As shown, the historical information 124 can include multiple entries 302a-n. Each entry 302a-n can include a carbon footprint associated with a job or task, a timestamp at which the job or task was executed, and characteristics of the job or task. For example, entry 302a can include the carbon footprint computed for Job 1, where Job 1 was executed at Timestamp 1 and had certain characteristics. An example of Job 1 can involve applying the continuous integration pipeline 126 to a prior version of the source code 104. Entry 302b can include the carbon footprint computed for Job 2, where Job 2 was executed at Timestamp 2 and had certain characteristics. An example of Job 2 can involve applying a different continuous integration pipeline to a piece of source code. Entry 302n can include the carbon footprint computed for Task N, where Task N was executed at Timestamp N and had certain characteristics. An example of Task N can involve compiling source code into an executable file as part of a continuous integration pipeline.

Using the historical information 124, the carbon footprint controller 112 can determine one or more carbon footprints associated with whichever prior jobs or tasks are closest to the target job or task (e.g., applying the continuous integration pipeline 126 to the source code 104). To determine which prior job or task is closest to a target job or task, the carbon footprint controller 112 can compare the characteristics of the prior jobs or tasks to the characteristics of the target job. For instance, the carbon footprint controller 112 can compare the types and settings of the prior jobs to the type and settings of the target job, to identify which of the prior jobs has the most in common with the target job. After determining which of the prior jobs or tasks is closest to the target job or task, the appropriate entries in the historical information 124 can be identified. The corresponding carbon footprints can then be extracted from the entries and used to determine a carbon footprint associated with the target job or task. This may be faster than going through the computational process described above with respect to FIG. 2, in which resource consumption is translated into carbon footprints via algorithms and/or lookup tables. After determining the carbon footprint associated with the target job or task, that information may be stored as a new entry in the historical information 124 for subsequent use.

Figure 4:
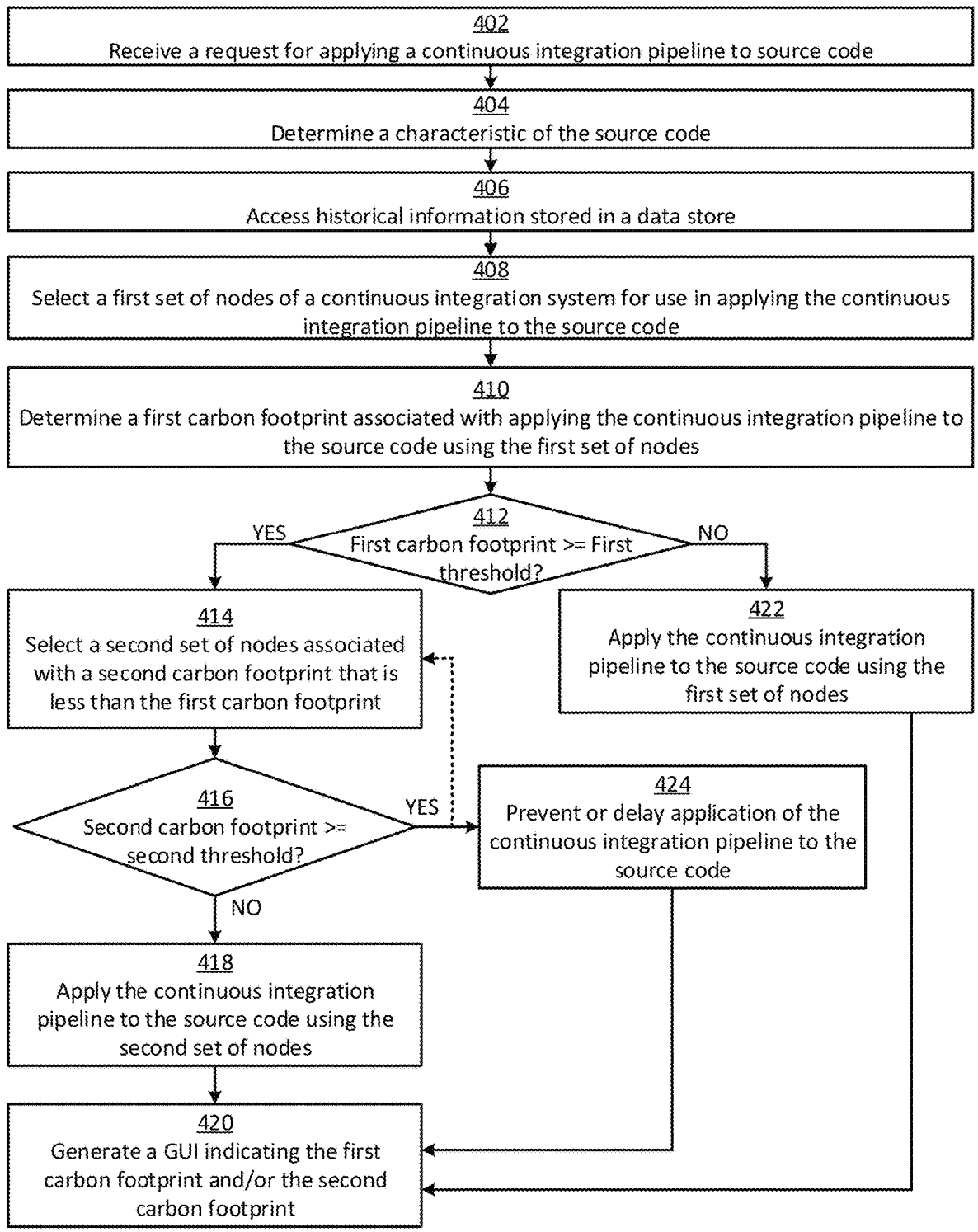
FIG. 4 shows a flow chart of an example of a process for managing a carbon footprint associated with executing a continuous integration pipeline according to some aspects of the present disclosure.

FIG. 4 shows a flow chart of an example of a process for managing a carbon footprint associated with executing a continuous integration pipeline according to some aspects of the present disclosure. Other examples may involve more operations, fewer operations, different operations, or a different order of operations than is shown in FIG. 4. The operations of FIG. 4 are described below with reference to the components of FIG. 1 above. While the below operations are described with reference to the continuous integration system 110, it will be appreciated that any one or more components of the continuous integration system 110 can perform some or all of the operations. For example, the carbon footprint controller 112 can perform some or all of the operations described below.

In block 402, a continuous integration system 110 receives a request 140 for applying a continuous integration pipeline 126 to source code 104. The continuous integration system 110 can receive the request 140 via one or more networks 108, such as the Internet. The request 140 may include the source code 104 or a unique identifier usable to obtain the source code 104 (e.g., from a code repository such as Github).

In block 404, the continuous integration system 110 determines a characteristic of the source code 104. For example, the continuous integration system 110 can analyze the source code 104 to determine a programming language in which the source code 104 is written, a length of the source code, a complexity of the source, dependencies (e.g., libraries) relied upon by the source code 104, or any combination of these. The continuous integration system 110 may perform at least some of this analysis by parsing the source code 104 for certain terms and phrases.

In block 406, the continuous integration system 110 accesses historical information 124 stored in a data store 122. The historical information 124 can be associated with prior executions of prior jobs or tasks by the continuous integration system 110. The historical information 124 can be generated by the carbon footprint controller 112 or any other suitable component of the continuous integration system 110.

In block 408, the continuous integration system 110 selects a first set of nodes 132 of the continuation integration system 110 for use in applying the continuous integration pipeline 126 to the source code 104. The continuous integration system 110 may select the first set of nodes 132 using any of the techniques described above. Additionally or alternatively, the carbon footprint controller 112 can select the first set of nodes 132 based on their availability to perform work. In some examples, the first set of nodes 132 may only include one node. Thus, a "set" does not necessarily require multiple nodes.

In block 410, the continuous integration system 110 determines a first carbon footprint 116 associated with applying the continuous integration pipeline 126 to the source code 104 using the first set of nodes 132. For example, the continuous integration system 110 can determine the first carbon footprint 116 based on one or more characteristics of the nodes 128a-c in the first set of nodes 132, one or more characteristics of the continuous integration pipeline 126, one or more the characteristics of the source code 104, one or more predefined rules, or any combination of these. The continuous integration system 110 can use the historical information 124 to determine the first carbon footprint 116.

In block 412, the continuous integration system 110 determines whether the first carbon footprint 116 meets or exceeds a first threshold (e.g., predefined threshold 138). The first threshold may be set by a user 106 or a system administrator. In some examples, the first threshold may be a maximum-allowable carbon footprint for a particular type of job, such as a maximum-allowable carbon footprint for applying the continuous integration pipeline 126 to the source code 104. Alternatively, the first threshold may be a maximum-allowable carbon footprint for a given user, such as a maximum-allowable carbon footprint for the user 106. In some examples, the first carbon footprint 116 can be considered to meet or exceed the first threshold when the first carbon footprint 116 alone, or in combination with other carbon footprints associated with previously executed jobs or tasks, exceeds the first threshold within a predefined time window. In some examples, the first threshold may be a maximum-allowable carbon footprint associated with a geographical region associated with the first set of nodes 132. Alternatively, the first threshold may be a maximum-allowable carbon footprint associated with a data center hosting the first set of nodes 132.

If the first carbon footprint 116 is below the first threshold, the process can continue to block 422, where the continuous integration system 110 can apply the continuous integration pipeline 126 to the source code 104 using the first set of nodes 123. For example, the carbon footprint controller 112 can schedule the continuous integration pipeline 126 for execution on the first set of nodes 132. This may involve scheduling continuous integration tasks, that make up the continuous integration pipeline 126, for execution on the first set of nodes 132.

If the first carbon footprint 116 meets or exceeds the first threshold, the process can continue to block 414. At block 414, the continuous integration system 110 can select a second set of nodes 134 associated with a second carbon footprint 118, where the second carbon footprint 118 is less than the first carbon footprint 116. In some examples, the second set of nodes 134 may only include one node.

The continuous integration system 110 may use any of the techniques described herein to select the second set of nodes 134. For instance, the continuous integration system 110 can select a set of nodes in the continuous integration system 110 using any of the techniques described herein, determine a carbon footprint associated with the set of nodes using any of the techniques described herein, and compare the carbon footprint to the first carbon footprint 116. If the carbon footprint associated with the selected set of nodes is greater than or equal to the first carbon footprint 116, a new set of nodes can be selected and the process can repeat. The process can be repeated until the continuous integration system 110 identifies a set of nodes with a carbon footprint that is less than the first carbon footprint 116. The continuous integration system 110 can then select that set of nodes as the second set of nodes 134.

At block 416, the continuous integration system 110 determines whether the second carbon footprint 118 meets or exceeds a second threshold. The second threshold may be the same as or different from the first threshold. The second threshold may be set by a user 106 or a system administrator. In some examples, the second threshold may be a maximum-allowable carbon footprint associated with a geographical region associated with the second set of nodes 134. Alternatively, the second threshold may be a maximum-allowable carbon footprint associated with a data center hosting the second set of nodes 134.

If the continuous integration system 110 determines that the second carbon footprint 118 meets or exceeds the second threshold, the process can continue to block 424. At block 424, the continuous integration system 110 determines can prevent or delay application of the continuous integration pipeline 126 to the source code 104. Preventing application of the continuous integration pipeline 126 may involve removing the continuous integration job from a job queue. Delaying application of the continuous integration pipeline 126 may involve queuing the continuous integration job until a predefined condition is satisfied (e.g., until a certain time interval has passed or the user 106 increases their subscription tier to a tier that has a higher carbon-footprint limit).

In other examples, the process can return to block 414, where the continuous integration system 110 can select a new set of nodes for use as the second set of nodes, and continue to block 416, where the continuous integration system 110 can determine whether a carbon footprint associated with the new set of nodes is less than the second threshold. This loop can iterate until a set of nodes is identified that has a corresponding carbon footprint that is both less than the first carbon footprint 116 and the second threshold. This alternative pathway is shown by a dashed arrow in FIG. 4.

If the continuous integration system 110 determines that the second carbon footprint 118 is less than the second threshold, the process can continue to block 418, where the continuous integration system 110 can apply the continuous integration pipeline 126 to the source code 104 using the second set of nodes 134. For example, the carbon footprint controller 112 can schedule the continuous integration pipeline 126 for execution on the second set of nodes 134. This may involve scheduling continuous integration tasks, that make up the continuous integration pipeline 126, for execution on the second set of nodes 134.

At block 420, the continuous integration system 110 generates a graphical user interface 114, such as a graphical dashboard. The graphical user interface 114 can be interactive and can display carbon footprint information to one or more entities, such as the user 106 or a system administrator. In some examples, the graphical user interface 114 can include the first carbon footprint 116, the second carbon footprint 118, or both of these.

Figure 5:
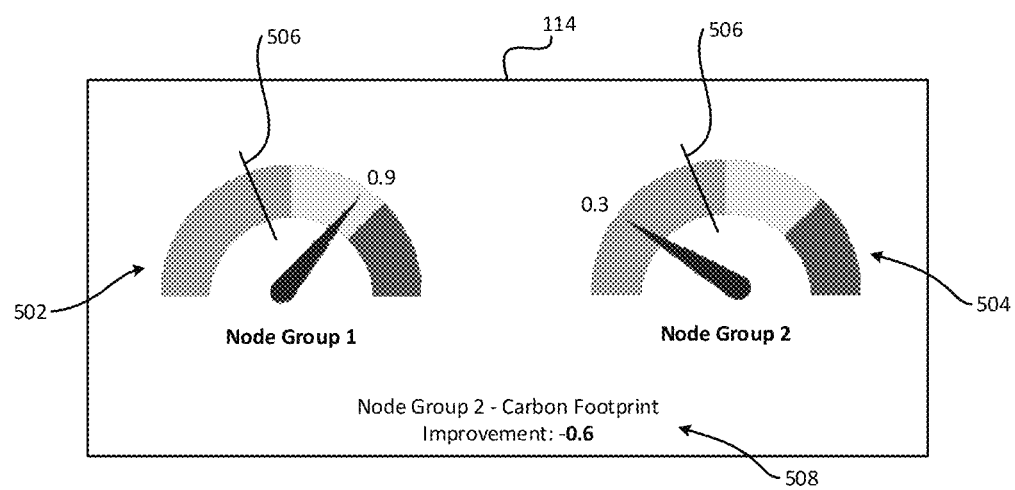
FIG. 5 shows an example of a graphical user interface for managing a carbon footprint associated with executing a continuous integration pipeline or other type of job according to some aspects of the present disclosure.

One example of the graphical user interface 114 is shown in FIG. 5. As shown, the graphical user interface 114 can include a first gauge 502 indicating the first carbon footprint 116 associated with the first set of nodes 132. The graphical user interface 114 additionally or alternatively include a second gauge 504 indicating the second carbon footprint 118 associated with the second set of nodes 134. Although gauges are used in this example, other graphical elements may be used additionally or alternatively to the gauges to convey similar information. One or more thresholds 506, such as the first threshold and/or the second threshold, may also be depicted in the graphical user interface 114. This may help the viewer understand why the second set of 132 was selected over the first set of nodes 132. The graphical user interface 114 can also include other information, such as the carbon footprint improvement resulting from using the second set of nodes 134 rather than the first set of nodes 132 to execute the continuous integration pipeline 126.

Figure 6:
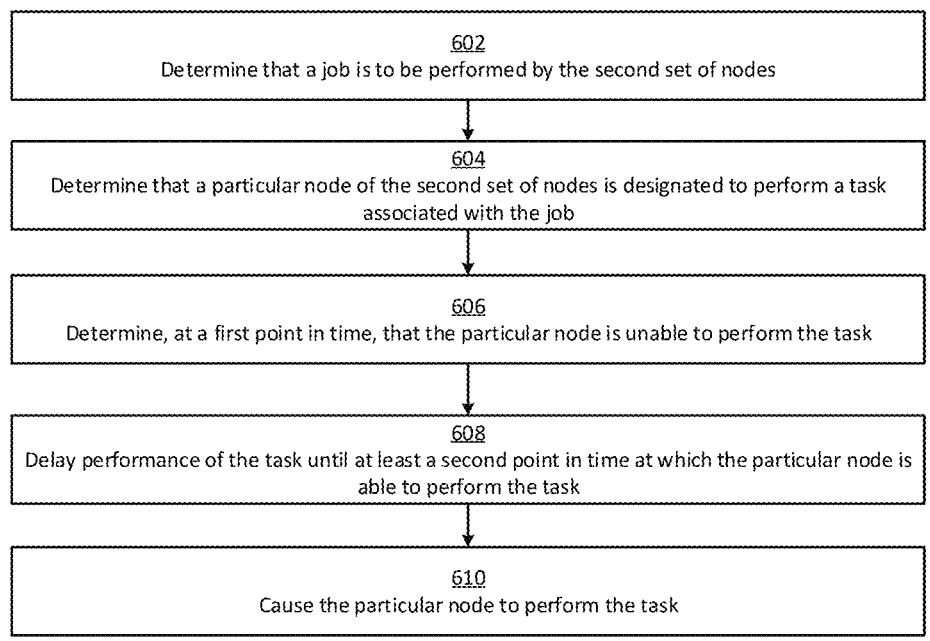
FIG. 6 shows a flow chart of an example of a process for delaying execution of a job (e.g., a continuous integration job) according to some aspects of the present disclosure.

FIG. 6 shows a flow chart of an example of a process for delaying execution of a job (e.g., a continuous integration job) according to some aspects of the present disclosure. Other examples may involve more operations, fewer operations, different operations, or a different order of operations than is shown in FIG. 6. The operations of FIG. 6 are described below with reference to the components of FIG. 1 above. While the below operations are described with reference to the continuous integration system 110, it will be appreciated that any one or more components of the continuous integration system 110 can perform some or all of the operations. For example, the carbon footprint controller 112 can perform some or all of the operations described below.

In block 602, the continuous integration system 110 determines that a job is to be performed by the second set of nodes 134. For example, the continuous integration system 110 can select the second set of nodes 134 using the process of FIG. 4 for use in applying the continuous integration pipeline 126 to the source code 104.

In block 604, the continuous integration system 110 determines that a particular node (e.g., node 128c) of the second set of nodes 134 is to perform a task associated with the job. An example of the job can be a continuous integration job, an example of the particular node can be node 128c, and an example of the task can be continuous integration task 130a. For example, the continuous integration system 110 can divide the job up into a set of tasks and schedule the tasks for execution on the nodes 128c-n of the second set of nodes 134.

In block 606, the continuous integration system 110 determines, at a first point in time, that the particular node is unable to perform the task. The particular node may be unable to perform the task because it is currently processing a maximum number of tasks and/or has insufficient capacity (e.g., processing power, memory, or storage available) to perform the task. In some examples, the continuous integration system 110 can determine that the particular node is unable to perform the task by communicating with the particular node to determine its current workload and/or capacity.

In block 608, the continuous integration system 110 delays performance of the task on the particular node until at least a second point in time at which the particular node is able to perform the task. The particular node may be able to perform the task if it is processing less than a maximum number of tasks and/or has sufficient capacity to perform the task.

In block 610, the continuous integration system 110 causes the particular node to perform the task. For example, the continuous integration system 110 schedule the task for execution on the particular node at the second point in time.

Figure 7:
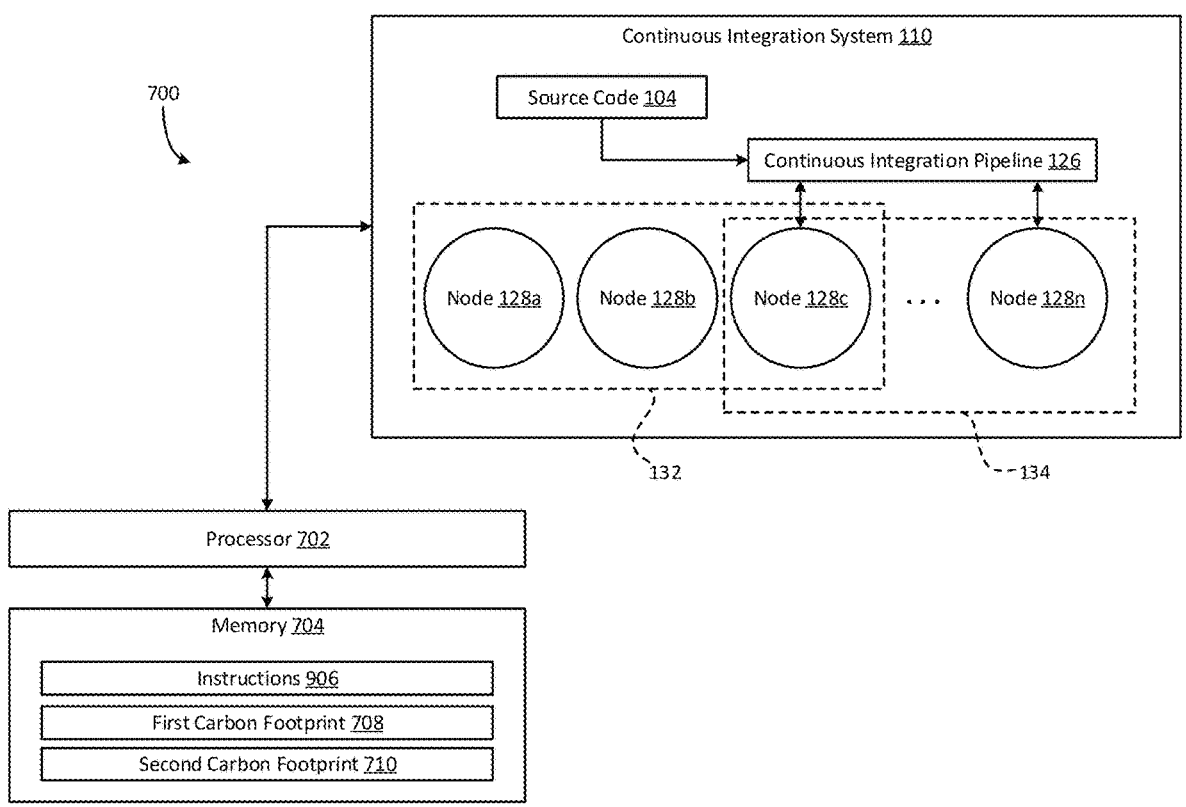
FIG. 7 shows a block diagram of an example of a system for managing a carbon footprint associated with executing a continuous integration pipeline according to some aspects of the present disclosure.

FIG. 7 shows a block diagram of an example of a system 700 for managing a carbon footprint associated with executing a continuous integration pipeline 126 according to some aspects of the present disclosure. The system 700 includes a processor 702 communicatively coupled to a memory 704. The processor 702 and memory 704 are both hardware that can be integrated into a single computing device or can be distributed from one another.

The processor 702 is hardware that can include one processing device or multiple processing devices. Examples of the processor 702 include a Field-Programmable Gate Array (FPGA), an application-specific integrated circuit (ASIC), and a microprocessor. The processor 702 can execute instructions 706 stored in the memory 704 to perform one or more operations. In some examples, the instructions 706 can include processor-specific instructions generated by a compiler or an interpreter from code written in any suitable computer-programming language, such as C, C++, C#, and Java. In some examples, the instructions 706 may correspond to the carbon footprint controller 112 of FIG. 1.

The memory 704 can include one memory device or multiple memory devices. The memory 704 can be volatile or non-volatile (i.e., the memory 704 can retain stored information when powered off). Examples of the memory 704 include electrically erasable and programmable read-only memory (EEPROM), flash memory, or any other type of non-volatile memory. At least a portion of the memory device includes a non-transitory computer-readable medium. A computer-readable medium can include electronic, optical, magnetic, or other storage devices capable of providing the processor 702 with the instructions 706 or other program code. Examples of a computer-readable medium include magnetic disks, memory chips, ROM, random-access memory (RAM), an ASIC, a configured processor, optical storage, or any other medium from which a computer processor can read the instructions 706.

Although the processor 702 and the memory 704 are shown separately from the continuous integration system 110 in FIG. 7, this is intended to be illustrative and non-limiting. In other examples, the processor 702 and/or the memory 704 can be included in the continuous integration system.

The processor 702 can execute the instructions 706 to perform operations. For example, the processor 702 can determine a first carbon footprint 708 associated with applying a continuous integration pipeline 126 to source code 104 using a first set of nodes 132 of a continuous integration system 110. The processor 702 can also select a second set of nodes 134 of the continuous integration system 110, where the second set of nodes 134 is associated with a second carbon footprint 710 that is lower than the first carbon footprint 708. The processor 702 can then control the continuous integration system 110 to apply the continuous integration pipeline 126 to the source code 104 using the second set of nodes 134. This may involve, for example, transmitting one or more commands configured to cause the continuous integration system 110 to apply the continuous integration pipeline 126 to the source code 104 using the second set of nodes 134.

Figure 8:
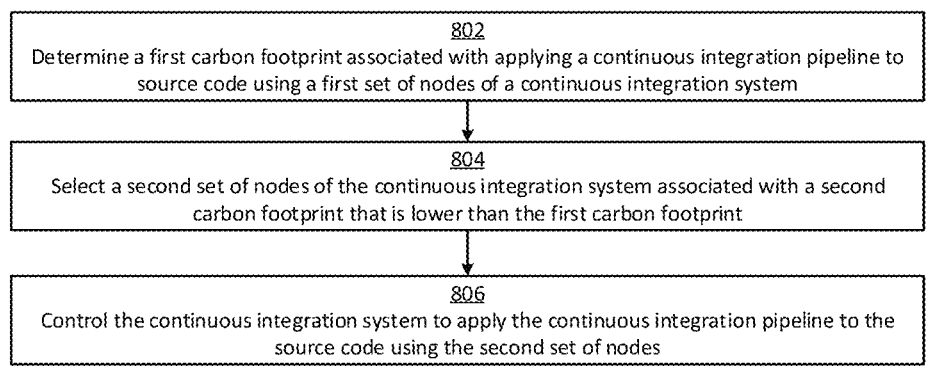
FIG. 8 shows a flow chart of an example of a process for managing a carbon footprint associated with executing a continuous integration pipeline according to some aspects of the present disclosure.

FIG. 8 shows a flow chart of an example of a process for managing a carbon footprint associated with executing a continuous integration pipeline according to some aspects of the present disclosure. Other examples may involve more operations, fewer operations, different operations, or a different order of operations than is shown in FIG. 8. The operations of FIG. 8 are described below with reference to the components of FIG. 1 above.

In block 802, the processor 702 determines a first carbon footprint 708 associated with applying a continuous integration pipeline 126 to source code 104 using a first set of nodes 132 of a continuous integration system 110. The processor 702 may determine the first carbon footprint 708 based on the characteristics of the first set of nodes 132, the characteristics of the continuous integration pipeline 126, the characteristics of the source code 104, or any combination of these. The processor 702 can determine the first carbon footprint 708 using any technique or combination of techniques described above.

In block 804, the processor 702 selects a second set of nodes 134 of the continuous integration system 110, where the second set of nodes 134 is associated with a second carbon footprint 710 that is lower than the first carbon footprint 708. The processor 702 may select the second set of nodes 134 based on the characteristics of the second set of nodes 134 (e.g., their hardware configuration, software configuration, and/or geographical location), the characteristics of the continuous integration pipeline 126, the characteristics of the source code 104, or any combination of these. The processor 702 can select the second set of nodes 134 and determine the second carbon footprint 710 using any technique or combination of techniques described above.

In block 806, the processor 702 controls the continuous integration system 110 to apply the continuous integration pipeline 126 to the source code 104 using the second set of nodes 134. For example, the processor 702 can schedule one or more continuous integration tasks to be executed on the second set of nodes 134.

While various examples have been described above with respect to a continuous integration system applying a continuous integration pipeline to source code, similar principles can be applied to other contexts. For example, similar principles can be applied to other types of jobs and tasks in other types of distributed computing systems. Some examples of these other contexts are described below with reference to FIGS. 9-10.

Figure 9:
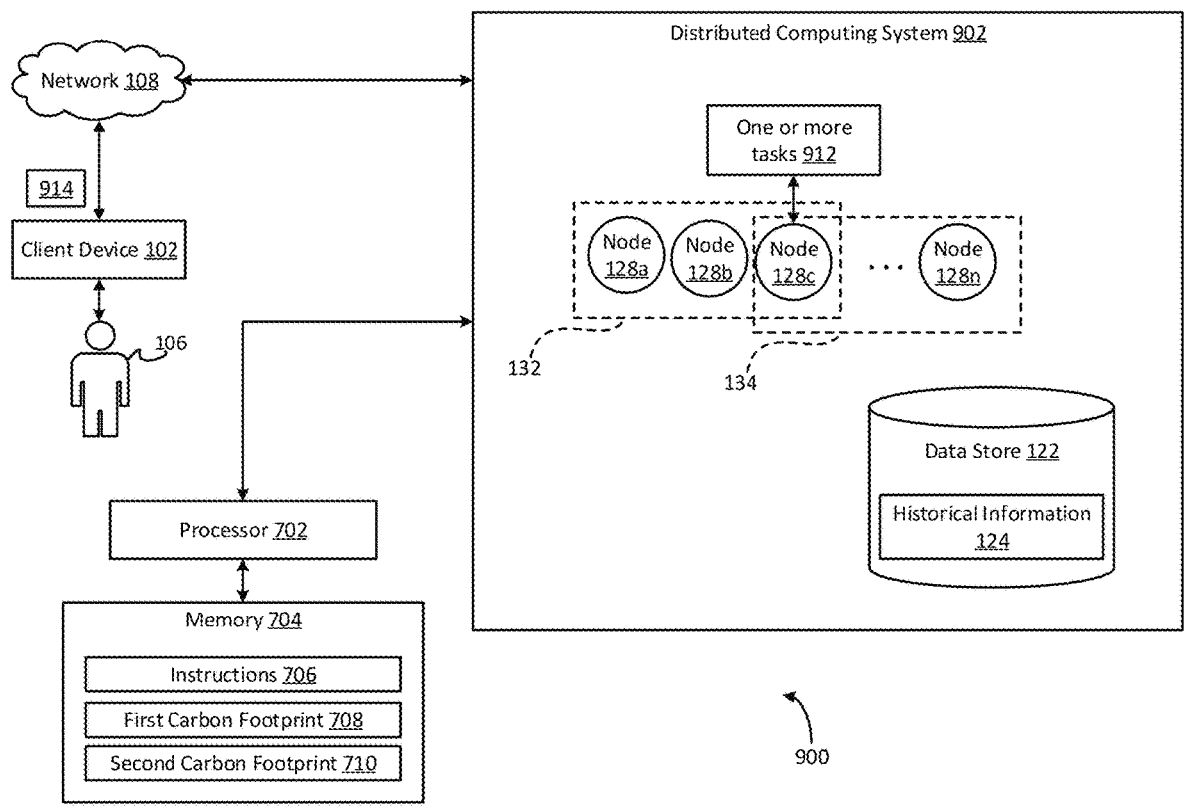
FIG. 9 shows a block diagram of an example of a system for managing a carbon footprint associated with executing a job according to some aspects of the present disclosure.

FIG. 9 shows a block diagram of an example of a system 900 for managing a carbon footprint associated with executing one or more tasks according to some aspects of the present disclosure. The system 900 includes a processor 702 communicatively coupled to a memory 904. The processor 702 may be part of a distributed computing system 902. Examples of the distributed computing system 902 can include a cloud computing system, a data grid, or a computing cluster. Alternatively, the processor 702 and memory 704 may be remote from the distributed computing system 902 and communicatively coupled to the distributed computing system 902 via one or more networks 108. The processor 702 can execute instructions 906 to perform operations. The instructions 906 may correspond to the carbon footprint controller 112 of FIG. 1, in some examples.

More specifically, the processor 702 can determine a first carbon footprint 708 associated with executing one or more tasks 912 using a first node 128a (or a first set of nodes 132) of the distributed computing system 902. The one or more tasks 912 can include continuous integration tasks or other kinds of tasks. The one or more tasks 912 can correspond to a single job or multiple jobs, which may be requested by one or more users. For example, the one or more tasks 912 may be part of a single job that is initiated based on a request 914 from a client device 102 of a user 106.

The processor 702 can also select a second node 128c (or a second set of nodes 134) of the distributed computing system 902, where the second node 128c is associated with a second carbon footprint 710 that is lower than the first carbon footprint 708. In some examples, the processor 702 can use any technique or combination of techniques described above to identify and select the second node 128c. For instance, the processor 702 can select the second node 128c based on the characteristics of the second node 128c and the characteristics of the one or more tasks. The processor 702 may determine the second carbon footprint 710 associated with the second node 128c using any technique or combination of techniques described above.

The processor 702 can then control the distributed computing system 902 to execute the one or more tasks 912 using the second node 128c. This may involve, for example, transmitting one or more commands configured to cause the distributed computing system 902 to schedule the one or more tasks 912 for execution on the node 128c.

Figure 10:
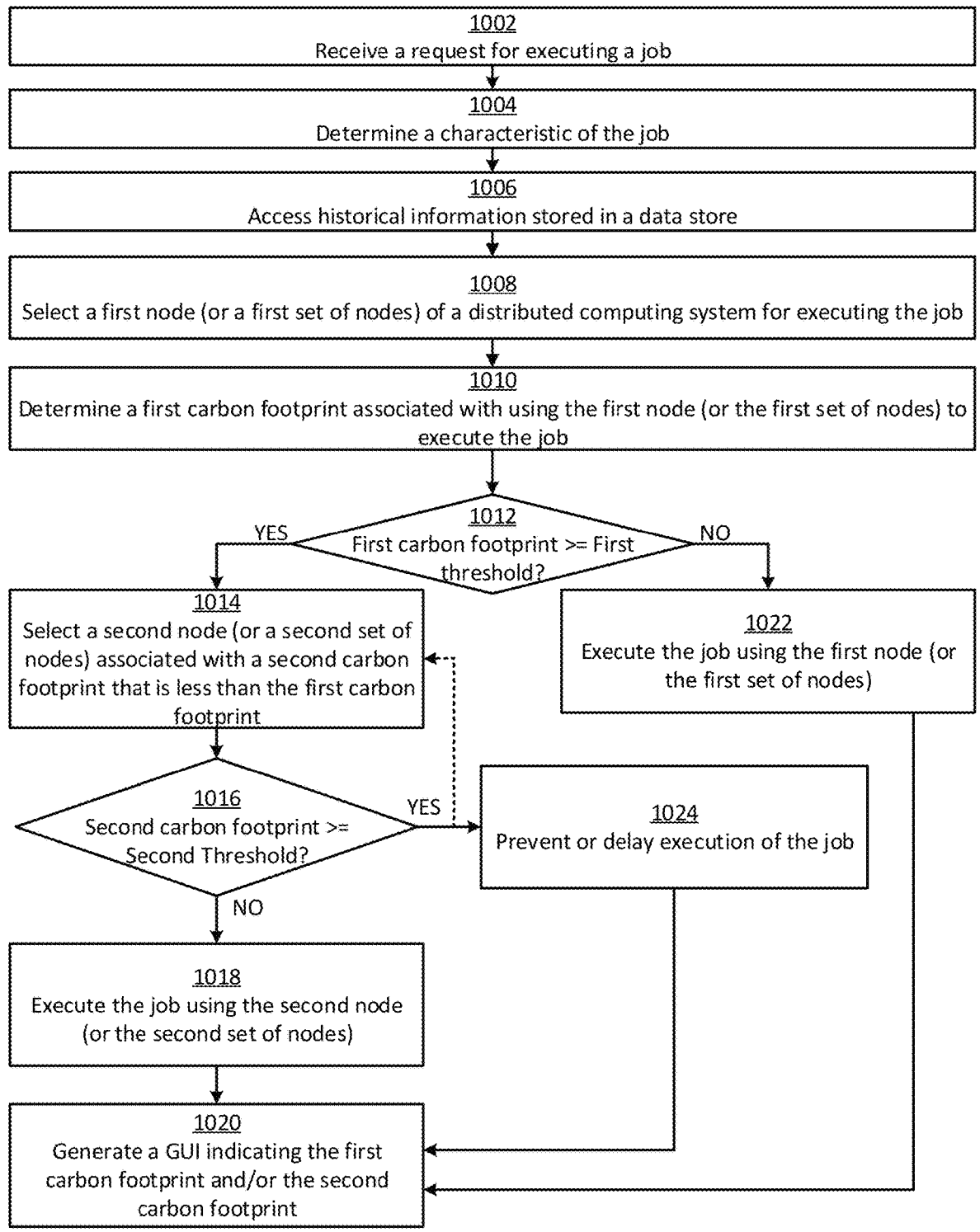
FIG. 10 shows a flow chart of an example of a process for managing a carbon footprint associated with executing a job according to some aspects of the present disclosure.

FIG. 10 shows a flow chart of an example of a process for managing a carbon footprint associated with executing a job according to some aspects of the present disclosure. Other examples may involve more operations, fewer operations, different operations, or a different order of operations than is shown in FIG. 10. The operations of FIG. 10 are described below with reference to the components of FIGS. 1 and 9 above. While the below operations are described with reference to the distributed computing system 902, it will be appreciated that any one or more components of the distributed computing system 902 can perform some or all of the operations. For example, a carbon footprint controller 112 within the distributed computing system 902 can perform some or all of the operations described below.

In block 1002, a distributed computing system 902 receives a request 914 for executing a job. The job can include one or more tasks 912. The distributed computing system 902 can receive the request 914 via one or more networks 108, such as the Internet.

In block 1004, the distributed computing system 902 determines a characteristic of the job. Examples of the characteristic can include a type, a length, a setting, or a priority of the job. In some examples, the distributed computing system 902 can determine the characteristic of the job by analyzing the job's parameters.

In block 1006, the distributed computing system 902 accesses historical information 124 stored in a data store 122. The historical information 124 can be associated with prior executions of prior jobs or tasks by the distributed computing system 902. The historical information 124 can be generated by any suitable component of the distributed computing system 902.

In block 1008, the distributed computing system 902 selects a first node 128a (or a first set of nodes 132) of the distributed computing system 902 for use in executing the job. The distributed computing system 902 may select the first node 128a (or the first set of nodes 132) using any of the techniques described above.

In block 1010, the distributed computing system 902 determines a first carbon footprint 116 associated with executing the job using the first node 128a (or the first set of nodes 132). For example, the distributed computing system 902 can determine the first carbon footprint 116 based on one or more characteristics of the first node 128a, one or more characteristics of job, one or more predefined rules, or any combination of these. The distributed computing system 902 can use the historical information 124 to determine the first carbon footprint 116.

In block 1012, the distributed computing system 902 determines whether the first carbon footprint 116 meets or exceeds a first threshold (e.g., predefined threshold 138). This may be similar to block 412 of FIG. 4.

If the first carbon footprint 116 is below the first threshold, the process can continue to block 1022, where the distributed computing system 902 can execute the job using the first node 128a (or the first set of nodes 132). For example, the distributed computing system 902 can schedule the job for execution on the first node 128a. This may involve scheduling one or more tasks 912 that make up the job for execution on the first node 128a.

If the first carbon footprint 116 meets or exceeds the first threshold, the process can continue to block 1014. At block 1014, the distributed computing system 902 can select a second node 128c (or a second set of nodes 134) associated with a second carbon footprint 118, where the second carbon footprint 118 is less than the first carbon footprint 116.

The distributed computing system 902 may use any of the techniques described herein to select the second node 128c (or the second set of nodes 134). For instance, the distributed computing system 902 can select second node 128c using any of the techniques described herein, determine a carbon footprint associated with the second node using any of the techniques described herein, and compare the carbon footprint to the first carbon footprint 116. If the carbon footprint associated with the selected node is greater than or equal to the first carbon footprint 116, a new node can be selected and the process can repeat. The process can be repeated until the distributed computing system 902 identifies a node with a carbon footprint that is less than the first carbon footprint 116. The distributed computing system 902 can then select that node as the second node.

At block 1016, the distributed computing system 902 determines whether the second carbon footprint 118 meets or exceeds a second threshold. The second threshold may be the same as or different from the first threshold. The second threshold may be set by a user 106 or a system administrator. In some examples, the second threshold may be a maximum-allowable carbon footprint associated with a geographical region associated with the second node 128c (or the second set of nodes 134). Alternatively, the second threshold may be a maximum-allowable carbon footprint associated with a data center hosting the second node 128c (or the second set of nodes 134).

If the distributed computing system 902 determines that the second carbon footprint 118 meets or exceeds the second threshold, the process can continue to block 1024. At block 1024, the distributed computing system 902 determines can prevent or delay execution of the job. Preventing execution of the job may involve removing the job from a job queue.

Delaying execution of the job may involve queuing the job until a predefined condition is satisfied (e.g., until a certain time interval has passed or the user 106 increases their subscription tier to a tier that has a higher carbon-footprint limit).

In other examples, the process can return to block 1014, where the distributed computing system 902 can select a new node (or a new set of nodes), and continue to block 1016, where the distributed computing system 902 can determine whether a carbon footprint associated with the new node (or set of nodes) is less than the second threshold. This loop can iterate until a node (or set of nodes) is identified that has a corresponding carbon footprint that is both less than the first carbon footprint 116 and the second threshold. This alternative pathway is shown by a dashed arrow in FIG. 10.

If the distributed computing system 902 determines that the second carbon footprint 118 is less than the second threshold, the process can continue to block 1018, where the distributed computing system 902 can execute the job using the second node 128c (or the second set of nodes 134). For example, the distributed computing system 902 can schedule the job for execution on the second node 128c (or second set of nodes 134). This may involve scheduling tasks, that make up the job, for execution on the second node 128c (or second set of nodes 134).

At block 1020, the distributed computing system 902 generates a graphical user interface 114, such as a graphical dashboard. The graphical user interface 114 can be interactive and can display carbon footprint information to one or more entities, such as the user 106 or a system administrator. In some examples, the graphical user interface 114 can include the first carbon footprint 116, the second carbon footprint 118, or both of these.

In some aspects, a carbon footprint associated with executing jobs (e.g., a continuous integration job) on computer nodes can be managed in accordance with one or more of the following examples. As used below, any references to a series of examples is to be understood as a reference to each of those examples disjunctively (e.g., "Examples 1-4" is to be understood as "Examples 1, 2, 3, or 4").

Example #1: A non-transitory computer-readable medium comprising program code that is executable by one or more processors for causing the one or more processors to perform operations including: determining a first carbon footprint associated with applying a continuous integration pipeline to source code using a first set of nodes of a continuous integration system; selecting a second set of nodes of the continuous integration system based on the second set of nodes being associated with a second carbon footprint that is lower than the first carbon footprint; and controlling the continuous integration system to apply the continuous integration pipeline to the source code using the second set of nodes.

Example #2: The non-transitory computer-readable medium of Example #1, wherein the operations further comprise: accessing historical information indicating resource consumption by hardware of the first set of nodes during a prior timespan; and determining the first carbon footprint based on the resource consumption.

Example #3: The non-transitory computer-readable medium of any of Examples #1-2, wherein the operations further comprise: accessing historical information indicating carbon footprints associated with prior executions of the continuous integration pipeline; and determining the first carbon footprint based on the carbon footprints.

Example #4: The non-transitory computer-readable medium of any of Examples #1-3, wherein the operations further comprise: determining one or more characteristics of the source code; and determining the first carbon footprint based on the one or more characteristics of the source code.

Example #5: The non-transitory computer-readable medium of Example #4, wherein the one or more characteristics of the source code include a length or a complexity of the source code.

Example #6: The non-transitory computer-readable medium of any of Examples #1-5, wherein the operations further comprise: determining that a continuous integration task is to be performed by the second set of nodes as part of the continuous integration pipeline; determining that a particular node of the second set of nodes is designated to perform the continuous integration task; determining, at a first point in time, that the particular node is unable to perform the continuous integration task; based on determining that the particular node is unable to perform the continuous integration task, delaying performance of the continuous integration task until at least a second point in time at which the particular node is able to perform the continuous integration task; and subsequent to the second point in time, causing the particular node to perform the continuous integration task.

Example #7: The non-transitory computer-readable medium of any of Examples #1-6, wherein the second set of nodes has at least one node that is also included in the first set of nodes.

Example #8: The non-transitory computer-readable medium of any of Examples #1-7, wherein the operations further comprise: determining a carbon footprint associated with applying the continuous integration pipeline to a piece of source code using the continuous integration system; determining that the carbon footprint exceeds a predefined threshold; and in response to determining that the carbon footprint exceeds the predefined threshold, preventing or delaying application of the continuous integration pipeline to the piece of source code.

Example #9: The non-transitory computer-readable medium of any of Examples #1-8, wherein the operations further comprise: generating a graphical user interface for display to an entity, the graphical user interface indicating the first carbon footprint associated with the first set of nodes.

Example #10: The non-transitory computer-readable medium of any of Examples #1-9, wherein the graphical user interface further indicates the second carbon footprint associated with the second set of nodes.

Example #11: A method comprising: determining, by one or more processors, a first carbon footprint associated with applying a continuous integration pipeline to source code using a first set of nodes of a continuous integration system; selecting, by the one or more processors, a second set of nodes of the continuous integration system based on the second set of nodes being associated with a second carbon footprint that is lower than the first carbon footprint; and controlling, by the one or more processors, the continuous integration system to apply the continuous integration pipeline to the source code using the second set of nodes.

Example #12: The method of Example #11, further comprising: accessing historical information indicating resource consumption by hardware of the first set of nodes during a prior timespan; and determining the first carbon footprint based on the resource consumption.

Example #13: The method of any of Examples #11-12, further comprising: accessing historical information indicating carbon footprints associated with prior executions of the continuous integration pipeline; and determining the first carbon footprint based on the carbon footprints.

Example #14: The method of any of Examples #11-13, further comprising: determining one or more characteristics of the source code; and determining the first carbon footprint based on the one or more characteristics of the source code.

Example #15: The method of Example #14, wherein the one or more characteristics of the source code include a length or a complexity of the source code.

Example #16: The method of any of Examples #11-15, further comprising: determining that a continuous integration task is to be performed by the second set of nodes as part of the continuous integration pipeline; determining that a particular node of the second set of nodes is designated to perform the continuous integration task; determining, at a first point in time, that the particular node is unable to perform the continuous integration task; based on determining that the particular node is unable to perform the continuous integration task, delaying performance of the continuous integration task until at least a second point in time at which the particular node is able to perform the continuous integration task; and subsequent to the second point in time, causing the particular node to perform the continuous integration task.

Example #17: The method of any of Examples #11-16, wherein the second set of nodes has at least one node that is also included in the first set of nodes.

Example #18: The method of any of Examples #11-17, further comprising: determining a carbon footprint associated with applying the continuous integration pipeline to a piece of source code using the continuous integration system; determining that the carbon footprint exceeds a predefined threshold; and in response to determining that the carbon footprint exceeds the predefined threshold, preventing or delaying application of the continuous integration pipeline to the piece of source code.

Example #19: The method of any of Examples #11-18, further comprising: generating a graphical user interface for display to an entity, the graphical user interface indicating the first carbon footprint associated with the first set of nodes, and the graphical user interface further indicating the second carbon footprint associated with the second set of nodes.

Example #20: A system comprising: one or more processors; and one or more memories including instructions that are executable by the one or more processors for causing the one or more processors to perform operations including: determining a first carbon footprint associated with applying a continuous integration pipeline to source code using a first set of nodes of a continuous integration system; selecting a second set of nodes of the continuous integration system based on the second set of nodes being associated with a second carbon footprint that is lower than the first carbon footprint; and controlling the continuous integration system to apply the continuous integration pipeline to the source code using the second set of nodes.

Example #21: A system comprising: means for determining a first carbon footprint associated with applying a continuous integration pipeline to source code using a first set of nodes of a continuous integration system; means for selecting a second set of nodes of the continuous integration system based on the second set of nodes being associated with a second carbon footprint that is lower than the first carbon footprint; and means for controlling the continuous integration system to apply the continuous integration pipeline to the source code using the second set of nodes.

Example #22: A non-transitory computer-readable medium comprising program code that is executable by one or more processors for causing the one or more processors to perform operations including: determining a first carbon footprint associated with executing one or more tasks using a first node of a distributed computing system; selecting a second node of the distributed computing system based on the second node being associated with a second carbon footprint that is lower than the first carbon footprint; and controlling the distributed computing system to execute the one or more tasks using the second node.

Example #23: The non-transitory computer-readable medium of Example #22, wherein the operations further comprise: determining that the first node is associated with a first carbon footprint factor; determining that the second node is associated with a second carbon footprint factor that is different than the first carbon footprint factor; and based on the second node being associated with the second carbon footprint factor, selecting the second node for use in executing the one or more tasks over the first node.

Example #24: The non-transitory computer-readable medium of any of Examples #22-23, wherein the operations further comprise: accessing historical information indicating resource consumption by hardware of the first set of nodes during a prior timespan; and determining the first carbon footprint by applying a predefined algorithm to the historical information.

Example #25: The non-transitory computer-readable medium of any of Examples #22-24, wherein the operations further comprise: accessing historical information indicating carbon footprints associated with prior executions of the one or more tasks; and determining the first carbon footprint based on the historical information.

Example #26: The non-transitory computer-readable medium of any of Examples #22-25, wherein the operations further comprise: determining one or more characteristics of the one or more tasks; and determining the first carbon footprint based on the one or more characteristics of the one or more tasks.

Example #27: The non-transitory computer-readable medium of Example #26, wherein the one or more characteristics of the one or more tasks includes a length or a complexity of a task.

Example #28: The non-transitory computer-readable medium of any of Examples #22-27, wherein the operations further comprise: determining, at a first point in time, that the second node is unable to perform a task; based on determining that the second node is unable to perform the task, delaying performance of the task until at least a second point in time at which the second node is able to perform the task; and subsequent to the second point in time, causing the second node to perform the task.

Example #29: The non-transitory computer-readable medium of any of Examples #22-28, wherein the one or more tasks include a continuous integration task.

Example #30: The non-transitory computer-readable medium of any of Examples #22-29, wherein the operations further comprise: determining a carbon footprint associated with executing a particular task using the distributed computing system; determining that the carbon footprint exceeds a predefined threshold; and in response to determining that the carbon footprint exceeds the predefined threshold, preventing or delaying execution of the task.

Example #31: The non-transitory computer-readable medium of any of Examples #22-30, wherein the operations further comprise: generating a graphical user interface for display to an entity, the graphical user interface indicating the first carbon footprint associated with the first node.

Example #32: The non-transitory computer-readable medium of Example #31, wherein the graphical user interface further indicates the second carbon footprint associated with the second node.

Example #33: A method comprising: determining, by one or more processors, a first carbon footprint associated with executing one or more tasks using a first node of a distributed computing system; selecting, by the one or more processors, a second node of the distributed computing system based on the second node being associated with a second carbon footprint that is lower than the first carbon footprint; and controlling, by the one or more processors, the distributed computing system to execute the one or more tasks using the second node.

Example #34: A non-transitory computer-readable medium comprising program code that is executable by the one or more processors for causing the one or more processors to perform operations including: determining a first carbon footprint associated with executing one or more tasks using a first set of nodes of a distributed computing system; selecting a second set of nodes of the distributed computing system based on the second node being associated with a second carbon footprint that is lower than the first carbon footprint; and controlling the distributed computing system to execute the one or more tasks using the second set of nodes.

Example #35: A method comprising: determining, by one or more processors, a first carbon footprint associated with executing one or more tasks using a first set of nodes of a distributed computing system; selecting, by the one or more processors, a second set of nodes of the distributed computing system based on the second set of nodes being associated with a second carbon footprint that is lower than the first carbon footprint; and controlling, by the one or more processors, the distributed computing system to execute the one or more tasks using the second set of nodes.

The above description of certain examples, including illustrated examples, has been presented only for the purpose of illustration and description and is not intended to be exhaustive or to limit the disclosure to the precise forms disclosed. Modifications, adaptations, and uses thereof will be apparent to those skilled in the art without departing from the scope of the disclosure. For instance, any examples described herein can be combined with any other examples.

The invention claimed is:

1. A non-transitory computer-readable medium comprising program code that is executable by one or more processors for causing the one or more processors to perform operations including:
   receiving a request to execute a continuous integration job involving applying a continuous integration pipeline to source code;
   predicting a first carbon footprint associated with executing the continuous integration job using a first set of nodes of a continuous integration system, wherein the first carbon footprint is predicted based on a first characteristic of the source code and a second characteristic of the continuous integration pipeline;
   predicting a second carbon footprint associated with executing the continuous integration job using a second set of nodes of the continuous integration system, and wherein the second carbon footprint is predicted based on the first characteristic of the source code and the second characteristic of the continuous integration pipeline;
   selecting the second set of nodes of the continuous integration system based on the second carbon footprint being lower than the first carbon footprint, wherein the selecting involves comparing the second carbon footprint to the first carbon footprint; and
   based on selecting the second set of nodes, scheduling the continuous integration job to be executed on the second set of nodes.

2. The non-transitory computer-readable medium of claim 1, wherein the operations further comprise:
   accessing historical information indicating resource consumption by different hardware configurations of nodes of the continuous integration system during a prior timespan;
   determining a hardware configuration associated with the first set of nodes; and
   determining the first carbon footprint based on the resource consumption associated with the hardware configuration.

3. The non-transitory computer-readable medium of claim 1, wherein the operations further comprise:
   accessing historical information that includes prior carbon footprints associated with prior executions of the continuous integration pipeline; and
   determining the first carbon footprint based on the prior carbon footprints.

4. The non-transitory computer-readable medium of claim 1, wherein the operations further comprise:
   determining that a continuous integration task is to be performed by the second set of nodes as part of the continuous integration pipeline;
   determining that a particular node of the second set of nodes is designated to perform the continuous integration task;
   determining, at a first point in time, that the particular node is unable to perform the continuous integration task;
   based on determining that the particular node is unable to perform the continuous integration task, delaying performance of the continuous integration task until at least a second point in time at which the particular node is able to perform the continuous integration task; and
   subsequent to the second point in time, causing the particular node to perform the continuous integration task.

5. The non-transitory computer-readable medium of claim 1, wherein the second set of nodes has at least one node that is also included in the first set of nodes.

6. The non-transitory computer-readable medium of claim 1, wherein the operations further comprise:
   determining a carbon footprint associated with applying the continuous integration pipeline to a piece of source code using the continuous integration system;
   determining that the carbon footprint exceeds a predefined threshold; and
   in response to determining that the carbon footprint exceeds the predefined threshold, preventing or delaying application of the continuous integration pipeline to the piece of source code.

7. The non-transitory computer-readable medium of claim 1, wherein the operations further comprise:
   generating a graphical user interface for display to an entity, the graphical user interface indicating the first carbon footprint associated with the first set of nodes.

8. The non-transitory computer-readable medium of claim 7, wherein the graphical user interface further indicates the second carbon footprint associated with the second set of nodes.

9. The non-transitory computer-readable medium of claim 1, wherein the operations further comprise:
determining a predefined carbon threshold;
determining whether the first carbon footprint meets or exceeds the predefined carbon threshold;
based on determining that the first carbon footprint meets or exceeds the predefined carbon threshold, select the second set of nodes for evaluation;
based on selecting the second set of nodes for evaluation, determine whether the second carbon footprint associated with the second set of nodes meets or exceeds the predefined carbon threshold; and
based on determining that the second carbon footprint is below the predefined carbon threshold, select the second set of nodes for use in executing the continuous integration pipeline.

10. The non-transitory computer-readable medium of claim 9, wherein the predefined carbon threshold corresponds to a user that submitted the source code.

11. The non-transitory computer-readable medium of claim 1, wherein the operations further comprise:
accessing historical information that includes characteristics of prior continuous integration jobs executed by the continuous integration system;
comparing the characteristics of the prior continuous integration jobs to characteristics of the requested continuous integration job;
selecting, from among the prior continuous integration jobs, a prior continuous integration job that is most similar to the requested continuous integration job according to a predefined criterion;
based on selecting the prior continuous integration job, determining a prior carbon footprint associated with the prior continuous integration job; and
predicting the first carbon footprint or the second carbon footprint based on the prior carbon footprint associated with the prior continuous integration job.

12. A method comprising:
receiving, by one or more processors, a request to execute a continuous integration job involving applying a continuous integration pipeline to source code;
predicting, by the one or more processors, a first carbon footprint associated with executing the continuous integration job using a first set of nodes of a continuous integration system, wherein the first carbon footprint is predicted based on a first characteristic of the source code and a second characteristic of the continuous integration pipeline;
predicting, by the one or more processors, a second carbon footprint associated with executing the continuous integration job using a second set of nodes of the continuous integration system, and wherein the second carbon footprint is predicted based on the first characteristic of the source code and the second characteristic of the continuous integration pipeline;
selecting, by the one or more processors, the second set of nodes of the continuous integration system based on the second carbon footprint being lower than the first carbon footprint, wherein the selecting involves comparing the second carbon footprint to the first carbon footprint; and
based on selecting the second set of nodes, scheduling, by the one or more processors, the continuous integration job to be executed on the second set of nodes.

13. The method of claim 12, further comprising:
accessing historical information indicating resource consumption by different hardware configurations of nodes of the continuous integration system during a prior timespan;
determining a hardware configuration associated with the first set of nodes; and
determining the first carbon footprint based on the resource consumption associated with the hardware configuration.

14. The method of claim 12, further comprising:
determining at least two characteristics of the source code; and
determining the first carbon footprint based on the at least two characteristics of the source code.

15. The method of claim 14, wherein the at least two characteristics of the source code include a length and a complexity of the source code.

16. The method of claim 12, further comprising:
determining that a continuous integration task is to be performed by the second set of nodes as part of the continuous integration pipeline;
determining that a particular node of the second set of nodes is designated to perform the continuous integration task;
determining, at a first point in time, that the particular node is unable to perform the continuous integration task;
based on determining that the particular node is unable to perform the continuous integration task, delaying performance of the continuous integration task until at least a second point in time at which the particular node is able to perform the continuous integration task; and
subsequent to the second point in time, causing the particular node to perform the continuous integration task.

17. The method of claim 12, wherein the second set of nodes has at least one node that is also included in the first set of nodes.

18. The method of claim 12, further comprising:
determining a carbon footprint associated with applying the continuous integration pipeline to a piece of source code using the continuous integration system;
determining that the carbon footprint exceeds a predefined threshold; and
in response to determining that the carbon footprint exceeds the predefined threshold, preventing or delaying application of the continuous integration pipeline to the piece of source code.

19. The method of claim 12, further comprising:
generating a graphical user interface for display to an entity, the graphical user interface indicating the first carbon footprint associated with the first set of nodes, and the graphical user interface further indicating the second carbon footprint associated with the second set of nodes.

20. A system comprising:
one or more processors; and
one or more memories including instructions that are executable by the one or more processors for causing the one or more processors to perform operations including:

receiving a request to execute a continuous integration job involving applying a continuous integration pipeline to source code;

predicting a first carbon footprint associated with executing the continuous integration job using a first set of nodes of a continuous integration system, wherein the first carbon footprint is predicted based on a first characteristic of the source code and a second characteristic of the continuous integration pipeline;

predicting a second carbon footprint associated with executing the continuous integration job using a second set of nodes of the continuous integration system, and wherein the second carbon footprint is predicted based on the first characteristic of the source code and the second characteristic of the continuous integration pipeline;

selecting the second set of nodes of the continuous integration system based on the second carbon footprint being lower than the first carbon footprint, wherein the selecting involves comparing the second carbon footprint to the first carbon footprint; and based on selecting the second set of nodes, scheduling the continuous integration job to be executed on the second set of nodes.

* * * * *